(12) United States Patent
Jensen et al.

(10) Patent No.: US 6,400,945 B1
(45) Date of Patent: Jun. 4, 2002

(54) SYSTEM FOR DIRECT COMMUNICATIONS WITH A SPACE CRAFT

(75) Inventors: James W. Jensen, Cocoa, FL (US); Daniel Linnihan, Richfield; Colin Gardner-Springer, Golden Valley, both of MN (US)

(73) Assignee: Satcom Direct, Inc., Satellite Beach, FL (US)

(*) Notice: Subject to any disclaimer, the term of this patent is extended or adjusted under 35 U.S.C. 154(b) by 0 days.

(21) Appl. No.: 09/303,844

(22) Filed: May 3, 1999

Related U.S. Application Data

(60) Provisional application No. 60/116,495, filed on Jan. 20, 1999.

(51) Int. Cl.[7] .................................................. H04Q 7/20
(52) U.S. Cl. ...................................... 455/431; 455/445
(58) Field of Search ............................... 455/445, 427, 455/430, 12.1, 13.1, 431

(56) References Cited

U.S. PATENT DOCUMENTS

| | | |
|---|---|---|
| 5,278,891 A | 1/1994 | Bhagat |
| 5,408,515 A | 4/1995 | Bhagat |
| 5,438,610 A | 8/1995 | Bhagat |
| 5,481,592 A | 1/1996 | Azer |
| 5,651,050 A | 7/1997 | Bhagat |
| 5,805,683 A | 9/1998 | Berberich |
| 5,828,957 A | 10/1998 | Kroeger |
| 5,839,053 A | 11/1998 | Bosch |
| 5,887,258 A | 3/1999 | Lemozit |
| 5,898,768 A | 4/1999 | Beyda |
| 5,907,541 A | 5/1999 | Fairholm |
| 5,913,164 A | 6/1999 | Pawa |
| 5,918,175 A | 6/1999 | Tayloe |
| 5,937,349 A | 8/1999 | Andresen |
| 5,950,129 A | 9/1999 | Schmid |
| 5,956,639 A | 9/1999 | Armbruster |
| 5,956,644 A | 9/1999 | Miller |
| 5,963,877 A | 10/1999 | Kobayashi |

*Primary Examiner*—Nguyen T. Vo
(74) *Attorney, Agent, or Firm*—Patterson, Thuente, Skaar & Christensen, P.A.

(57) ABSTRACT

An automated communication system for communicatively connecting a caller by means of a telephone to an space craft includes a port for accepting a telephonic call related to a specific space craft from the caller and having a machine readable call management program, the call management program automatically effecting a telephonic communication to at least one selected ground earth station responsive thereto. The ground earth station effects communication with at least one known satellite in an earth orbit responsive to the received communication from the port. And, the satellite retransmits the ground earth station communications to the space craft for reception by a dedicated receiver in the space craft, thereby establishing a telephonic communications link from the caller to the specific space craft. A method and a program for effecting global communications between a ground station, a plurality of global satellite systems and a space craft are included.

31 Claims, 9 Drawing Sheets

Fig. 2

DEFAULT DATABASE (ODB)
TABLE 1

| SATELLITE ID | SATELLITE NAME | GES ID | GES LOCATION | GES OWNER/ SERVICE PROVIDER |
|---|---|---|---|---|
| 00 | AOR-W | 001 | GOONHILLY, UK | SKYPHONE |
| 00 | AOR-W | 002 | SOUTHBURY, USA | COMSAT |
| 00 | AOR-W | 003 | LAURENTIDES, CANADA | STRATOS |
| 00 | AOR-W | 005 | AUSSAGUAL, FRANCE | STRATOS AND SATELLITE AIRCOM |
| 01 | AOR-E | 101 | GOONHILLY, UK | SKYPHONE |
| 01 | AOR-E | 103 | AUSSAGUAL, FRANCE | STRATOS AND SATELLITE AIRCOM |
| 01 | AOR-E | 104 | EIK, NORWAY | SKYPHONE |
| 01 | AOR-E | 105 | FUCINO, ITALY | COMSAT |
| 02 | POR | 201 | SENTOSA, SINGAPORE | SKYPHONE |
| 02 | POR | 202 | SANTA PAULA, USA | COMSAT |
| 02 | POR | 203 | YAMAGUCHI, JAPAN | COMSAT/KDD |
| 02 | POR | 205 | PERTH, AUSTRALIA | SATELLITE AIRCOM |
| 02 | POR | 206 | NILES CANYON, CANADA | STRATOS |
| 02 | POR | 207 | BRUNIE | BRUNIE |
| 02 | POR | 210 | KUMSAN, KOREA | COMSAT/KDD |
| 03 | IOR | 301 | EIK | SKYPHONE |
| 03 | IOR | 302 | NONTHABURI, THAILAND | CONSAT/KDD |
| 03 | IOR | 303 | AUSSAGUAL, FRANCE | SATELLITE AIRCOM |
| 03 | IOR | 305 | PERTH, AUSTRALIA | SATELLITE AIRCOM |
| 03 | IOR | 306 | YAMAGUCHI, JAPAN | COMSAT/KDD |
| 03 | IOR | 307 | BRUNIE | BRUNIE |
| 03 | IOR | 310 | SENTOSA, SINGAPORE | SKYPHONE |
| 03 | IOR | 312 | FUCINO, ITALY | COMSAT |

Fig. 3

| Fig. 3a | Fig. 3b | Fig. 3c |
|---|---|---|

Fig. 4A

| Fig. 4A-1 | Fig. 4A-2 | Fig. 4A-3 |
|---|---|---|

SYSTEM FOR DIRECT COMMUNICATIONS WITH A SPACE CRAFT

RELATED APPLICATION

This application claims the benefit of U.S. Provisional Application No. 60/116,495, filed Jan. 20, 1999, which is incorporated by reference herein in its entirety.

FIELD OF THE INVENTION

The present invention generally pertains to a system implemented to provide direct global ground to air and air to ground communications between a space craft and a terrestrial station. Specifically, the invention relates to a computer-implemented software which enables direct communications between a ground position and a specified spacecraft via a global aeronautical satellite communications system based on an operator's data base.

DESCRIPTION OF RELATED ART

There are several types of satellites deployed into orbit around the earth. Some satellites reflect communications directed at the satellite. Many satellites carry repeaters (for receiving and retransmitting a received communication) and are used for communication. In recent years satellites have been placed in synchronous orbits (synchronous with the earth's rotation), thereby providing continuous communications capability among almost all parts of the globe. If a satellite is placed in synchronous orbit above the equator, to revolve in the same direction of the earth's rotation and synchronized with the earth's rotation, that satellite will continually remain above a fixed point on the surface of the earth. Many communications satellites have been placed in these synchronous orbits to cover different regions of the globe.

Generally, active communications satellites are orbiting repeaters with broadband characteristics. A signal from a ground station is intercepted by the satellite, converted to another frequency and retransmitted at a moderate power level to an end user receiver. This provides much better signal strength at the receiving end of the circuit, as compared with a signal that is merely reflected from a passive satellite. Active communications satellites are placed in synchronous orbits making it possible to use them with fixed antennas, a moderate level of transmitter power and at any time of the day or night. Synchronous satellites are used for television and radio broadcasting, communications, weather forecasting, and military operations. Nowadays, most telephone calls are routinely carried by synchronous satellites.

Further, a constellation of satellite systems is used to cover major regions of the globe to enable ground to aircraft (and aircraft to ground) communications via the satellite systems. One example of such a constellation is INMARSAT, which has four satellites that are located in geostationary orbits and generally each cover a region of approximately one-fourth of the world with a certain amount of overlap between regions. These satellites are referred to as AOR-Attorney W (Atlantic ocean region-west), AOR-E (Atlantic ocean region-east), IOR (Indian ocean region), and POR (Pacific Ocean Region). INMARSAT satellites support three different types of services to the aeronautical market. These services are defined as AERO H, AERO H+, AERO I and AERO M. The only active service is AERO H system. The AERO H system provides aircraft with multiple digital voice, fax, and real-time data communications capabilities. The system is specifically adapted for use in global two-way ground to air communications by aircraft operators requiring voice, fax, and data communications for their flight crews and passengers.

Similarly, the AERO I system provides aircraft with multiple digital voice, fax and real-time communications capabilities. This service is tailored to meet the communication needs of short/medium haul aircraft operators requiring voice, fax and data communications for the flight crew and passengers. AERO I spot beam service is available within each INMARSAT satellite region around the world. Each region contains several spot beams and users must be illuminated by a spot beam for an AERO I system to operate. Not all satellite regions have complete spot beam coverage and, based on the geographic location of an aircraft, users may not be able to use their AERO I system all the time.

The INMARSAT AERO H+ system provides aircraft the option to use AERO H or AERO I based on the geographic location of the aircraft. To take advantage of this option, the aeronautical communication system must be able to support both AERO H and AERO I.

Prior art systems have utilized direct ground to air calling systems which provide communications between aircraft and GES's. Generally, customers are provided with a calling card with instructions on how to call their aircraft. The card is customized to each customer's aircraft numbers and typically includes a pictorial image of the globe on both sides of the card. Typically, one side of the card shows three-fourths of the world surface and the other side shows the remaining one-fourth of the world surface. The user must first know the specific geographic location of the aircraft at the time of the call. Then, based on the geographic location of the aircraft (which must be known by the caller), the caller calls the applicable number referenced on either side of the card as corresponding to the known geographic location of the aircraft. For example a typical user trying to communicate with an aircraft based on three-quarters of the world coverage may have to dial several numbers then wait for voice, enter PIN, enter the satellite area code and enter the aircraft number and terminal location. This process requires dialing over thirty-one sequential numbers in addition to waiting for voice confirmation. Similarly, a communication based on one-fourth of the world coverage requires entering/dialing twenty-seven numbers. The dialing complexity involving such a large number of sequential numbers has greatly deterred use of such ground-to-air communications for contacting an aircraft.

Further, prior art systems which use synchronous satellite systems, such as the INMARSAT, for inbound and outbound telephone calls from a ground station to aircraft require the input of a number of variables to make the calls. In addition to the need to dial several access numbers, callers must know the location of the aircraft, the satellite Area code to which the aircraft is logged on to, the aircraft number, the aircraft terminal number, international access code for the specific global position of the aircraft and identification of the long distance provider may be required because not all long distance service providers may recognize the satellite area codes. Furthermore, if the aircraft is located in the AOR-E or IOR regions a call may not be made from North America. This is because AT&T, MCI and SPRINT use COMSAT for such communications. COMSAT is not a global aeronautical provider having access to the AOR-E and IOR regions.

Accordingly, prior art direct call systems are unreliable and cumbersome at best. Further, within each satellite region there are a number of Ground Earth Stations (GES), which are owned and operated by different entities and each GES provides different types of aeronautical services. For example, some GES operators support fax, while others may not offer such service. Similarly, not all GES operators support PC data, secure voice management, DID (direct in dial) and AESID (Aircraft Earth Station Identifier). Thus, some GES may support multiple numbers assigned/allocated for various services, while others have only very few numbers available to support a broad range of communication services.

There is, therefore, a need for a global calling system to enable ground stations to call an aircraft anywhere within INMARSAT and similar communication satellite systems by using only one simple phone number without the necessity for human intervention. The system should be fully automatic and mechanically implemented. Further, there is a need to provide a ground to air communications system with comprehensive features to enable real-time and efficient communications between aircraft and ground earth stations on a global coverage basis.

SUMMARY OF THE INVENTION

It is an object of the present invention to provide an interactive direct calling system structured to be modularly adaptable to satellite communication systems. The direct calling system preferably includes a software system implemented to enable efficient and reliable communications between an aircraft and a user, through a GES. The direct dialing system is based on specific numbers applicable to the global position and the type of satellite used. Preferably, only ten digits need be dialed to automatically effect ground-to-air communications by voice and fax. The ten digits include an area code and a seven digit phone number, the seven digit number being specific to the specific aircraft being called.

It is yet another object of the invention to provide a global direct ground to air satellite communication and calling system. The system includes an operators data base (ODB) implemented in the host ground earth station, the satellite and the aircraft.

Another object of the invention is to provide a direct access number that is customized to an aircraft. The system preferably uses two or more consortium partners of INMARSAT to provide global aeronautical communications. The system integrates, for example, both Comsat and Skyphone services to enable global communications for AERO H users, neither Comsat nor Skyphone alone being global in its coverage.

It is a further object of the invention to provide a customized configuration of the ODB to match the chief characteristics of the functional units of the GES and the satellite.

Yet another object of the invention is to provide a specific and generic software. The specific software is designed to serve customers with special needs and requirements while the generic software is applicable for general use.

It is yet another object of the invention to provide a software system which is initiable by calling a specific number assigned to a specific airplane using an assigned terrestial long distance number or 800 number.

Yet another object of the invention is to provide a seamless global communications coverage to enable ground-to-air communications based on a data base software system implemented in a plurality of satellites covering the whole globe, GES and aircraft systems.

The present invention is an automated communication system for communicatively connecting a caller by means of a telephone to an aircraft and includes a port for accepting a telephonic call related to a specific space craft from the caller and having a machine readable call management program, the call management program automatically effecting a telephonic communication to at least one selected ground earth station responsive thereto. The ground earth station effects communication with at least one known satellite in an earth orbit responsive to the received communication from the port. And, the satellite retransmits the ground earth station communications to the aircraft for reception by a dedicated receiver in the space craft, thereby establishing a telephonic communications link from the caller to the specific space craft. The present invention further includes a method and a program for effecting global communications between a ground station, a plurality of global satellite systems and a space craft.

Additional details, objects, advantages will become apparent with reference to the illustrations and drawings offered to disclose the significant features, structures and mechanisms of the present invention. The drawings are presented herein to provide a depiction of the significant features of the invention.

DESCRIPTION OF THE PREFERRED EMBODIMENT

The present invention provides a simplified calling system to enable real-time global communication between a ground station and a space craft, including an aircraft. The system utilizes a software program at a call-in site (a port), an operator data base (OBD) implemented in a GES, a satellite system and a space craft. The software program manages the operator data base to enable direct communication, including voice and fax, between the GES and aircraft located in any region of the world.

Figures 1, 4A:
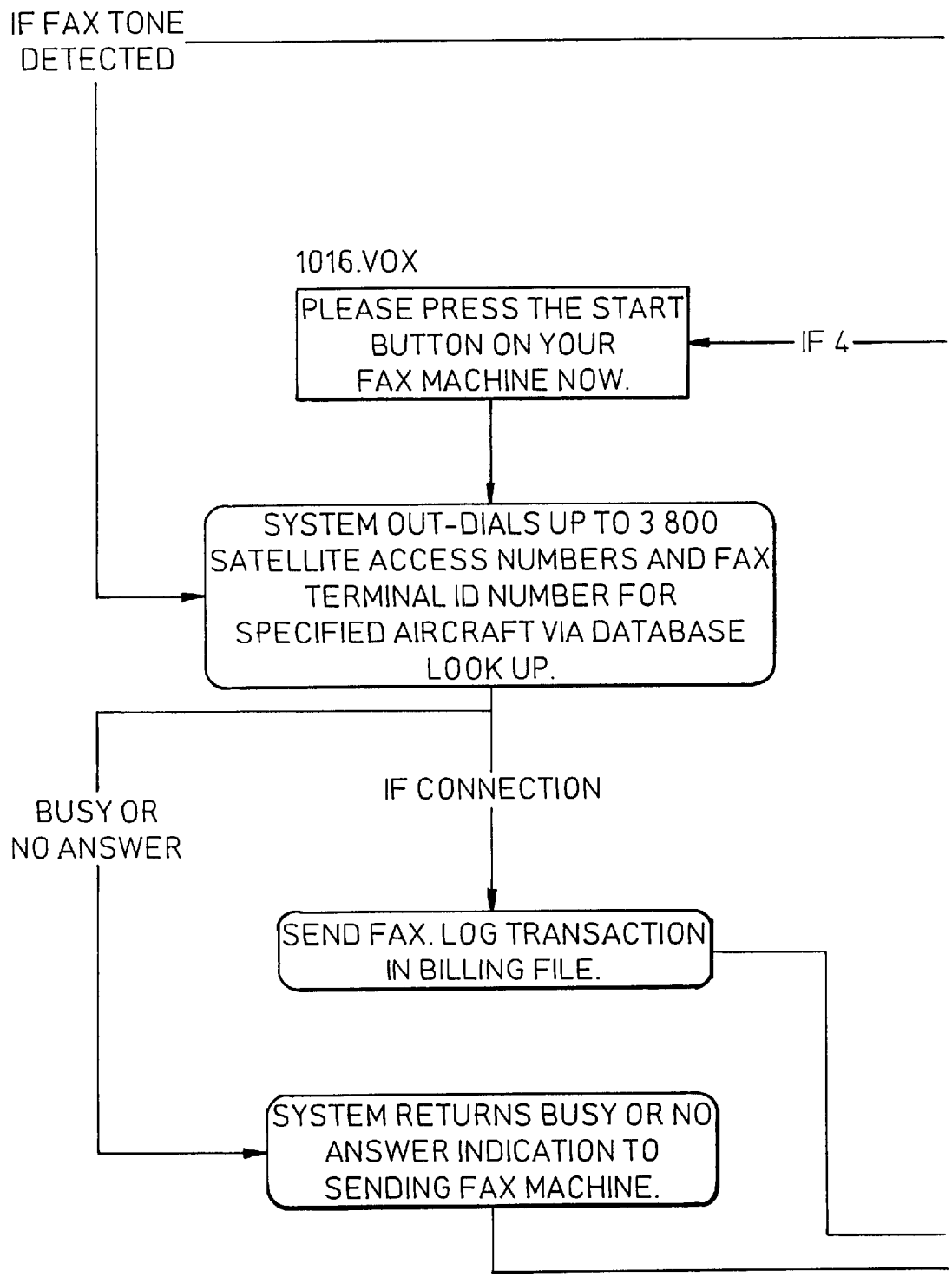
FIGS. 4A and 4B represent a software logic flow chart of another aspect of the invention.
Figures 2, 4A:
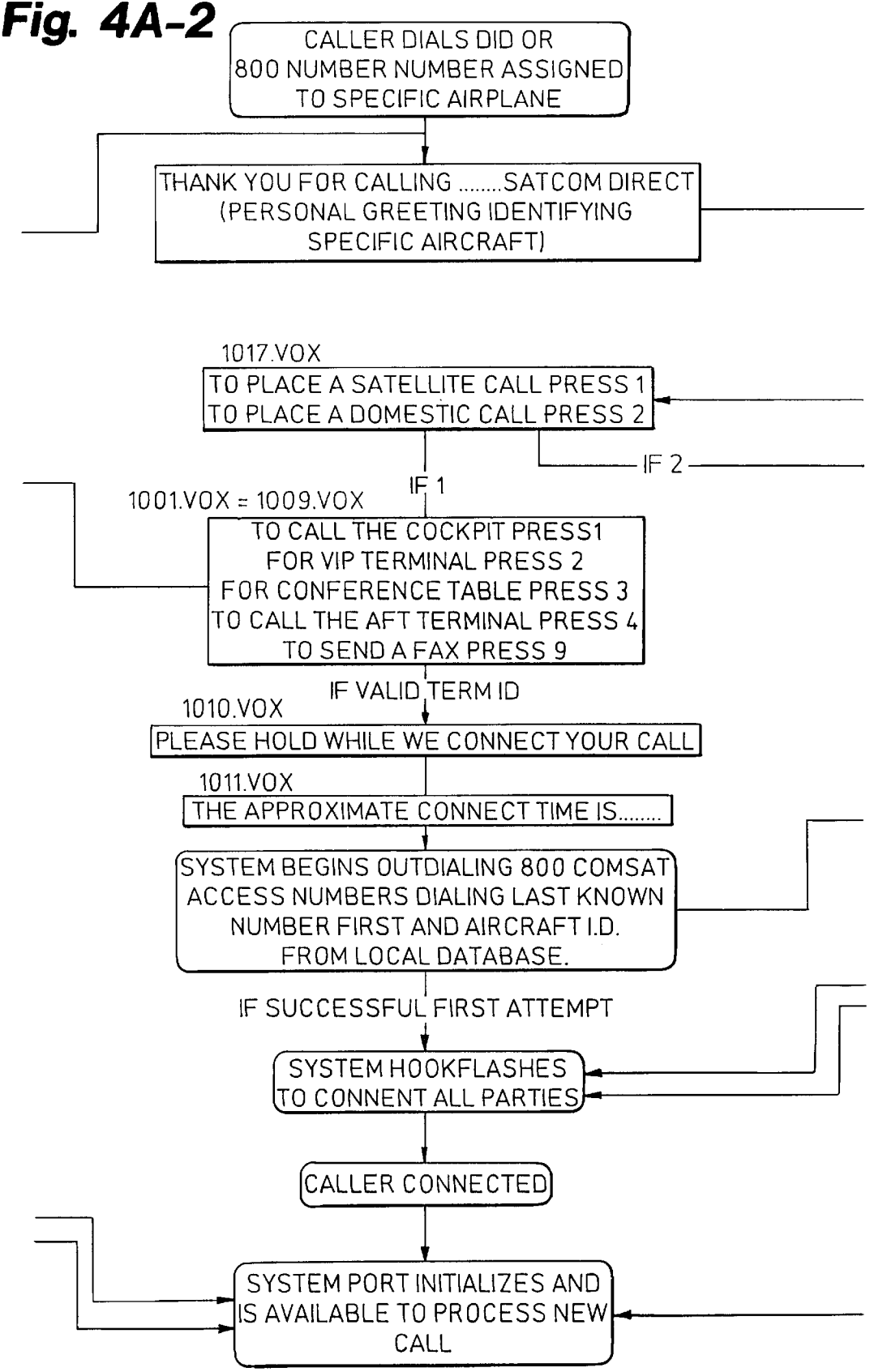
FIG. 2 is a table showing the default data listing for the operators data base.

Referring to FIGS. 1–4, in relevant parts, a global two-way air to ground communication system, including a software system implemented in the aircraft, the ground station and the satellite, is disclosed. The software system is configurable to various platforms including but not limited to Honeywell and Rockwell systems. The operator data base is preferably configured to all INMARSAT satellites and ground earth stations as illustrated in FIG. 2. Other operator data base configurations are provided in tables 2 and 3 submitted herewith.

Figures 3, 4A:
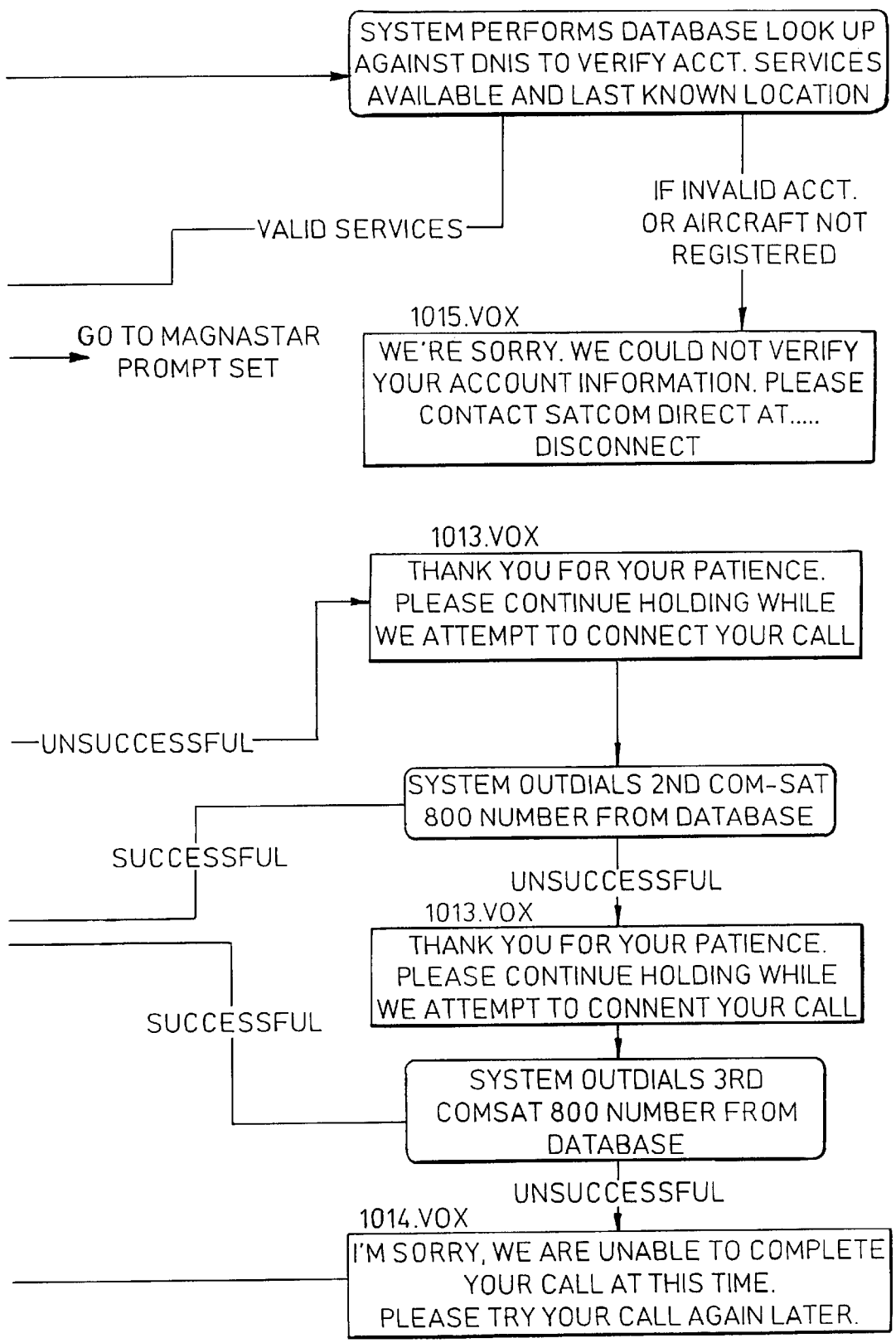

In accordance with the logic flow chart of FIGS. 3 and 4, the direct call is initiated by a caller calling a number assigned to the aircraft. The number is preferably a ten digit number for simplicity. The ten digit number is preferably presented on a wallet sized card that is presented to the user and may be conveniently carried on the person of the user at needed times. A quick reference to the number on the cared prepares the user for establishing communication with the space craft over any convenient terrestrial telephonic communications system. Initiating communication with the ten digit number may be as simple as dialing a long distance call. The program immediately checks to see if a fax tone from the caller is detected and simultaneously broadcasts a recorded personal greeting to the caller identifying the specific aircraft called. Subsequently, the program logic proceeds to search the data base for account verification, services available and last known location of the aircraft. If the account is found invalid or the aircraft not identified, a recorded voice message is broadcast to the caller with directions to contact the GES directly and the call is disconnected.

In the alternate, if the call is valid, the caller is given instructions to proceed to the next step of either connecting to a service or person or a procedure to send a fax. This selection by the caller directs the call to a specific site in the aircraft, for example to the flight deck or to a conference table. These sites are aircraft specific and maintained in the software. Some aircraft have multiple independent sites within the aircraft at which a call may be received. For non-fax calls, the program logic proceeds to connect the caller by outdialing the access number to the selected aircraft site. In this regard the program logic preferably dials the last known number first and the aircraft I.D. dependent upon the local database. If a successful connection has been made upon the first attempt, a system hook flashes to connect all parties and the caller is connected. Subsequently, the program logic initializes the system port and makes it ready and available to process a new call.

Figure 1:
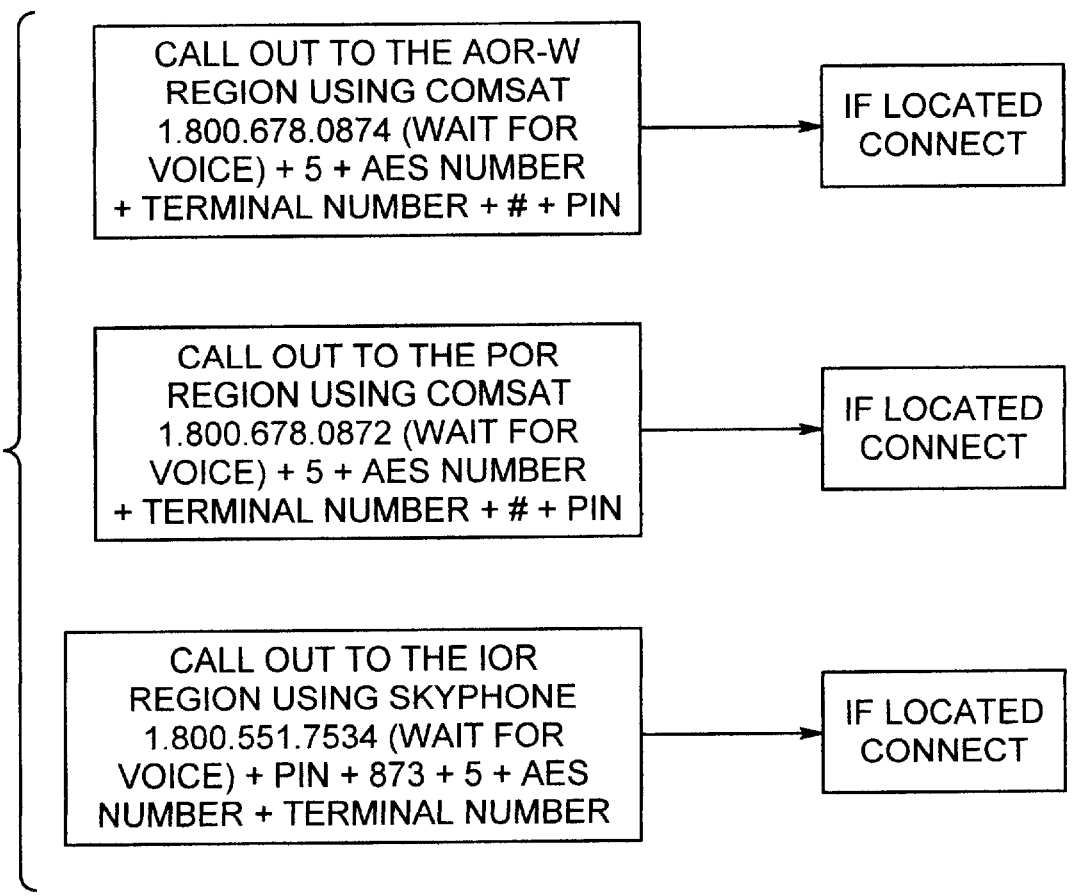
FIG. 1 is an abbreviated format of the process for direct dialing in one of AOR-W and POR regions using Comsat and calling IOR region using Skyphone.
Figure 3A:
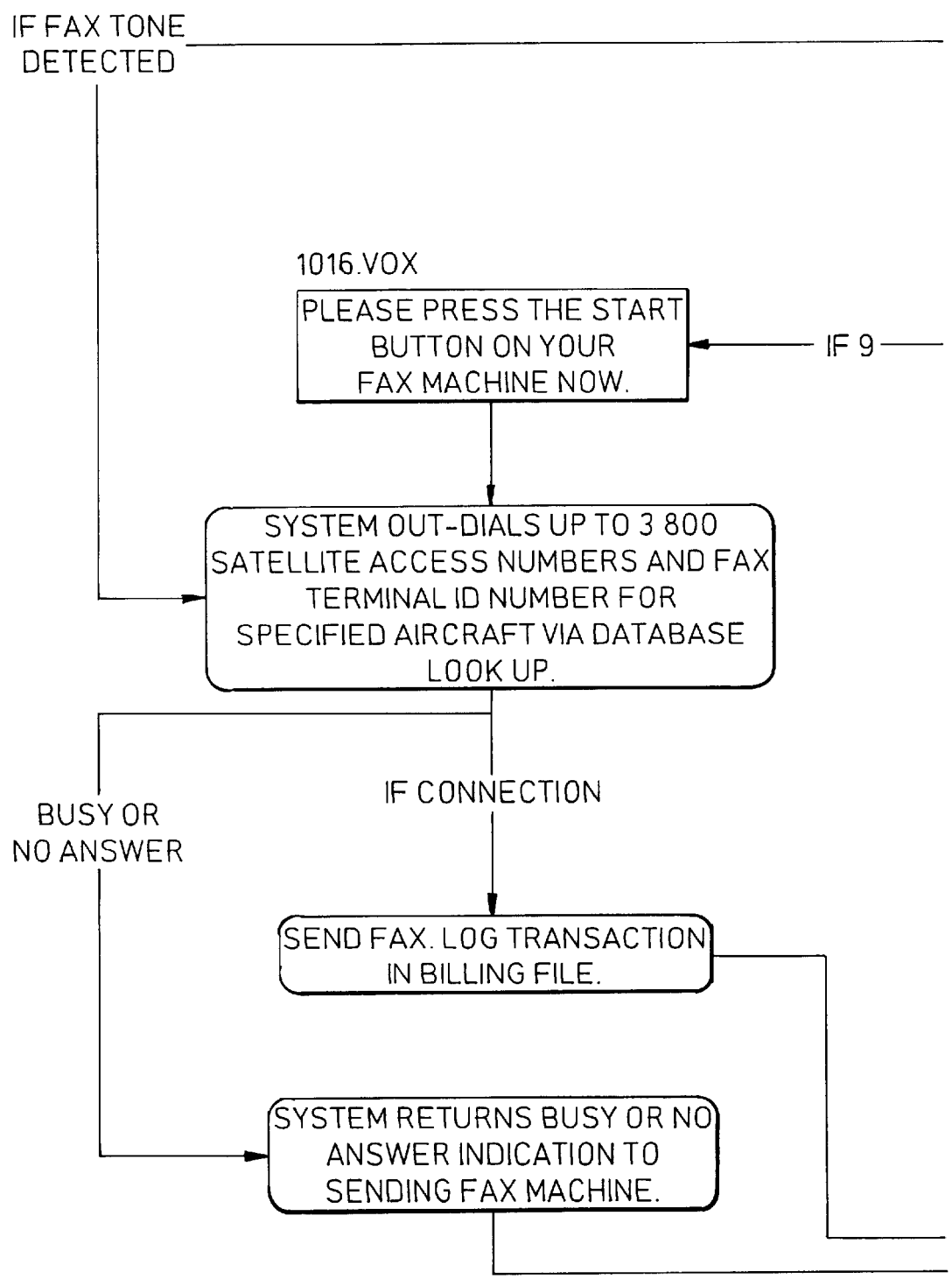
FIG. 3 is a software logic flow chart of one aspect of the invention.
Figure 3B:
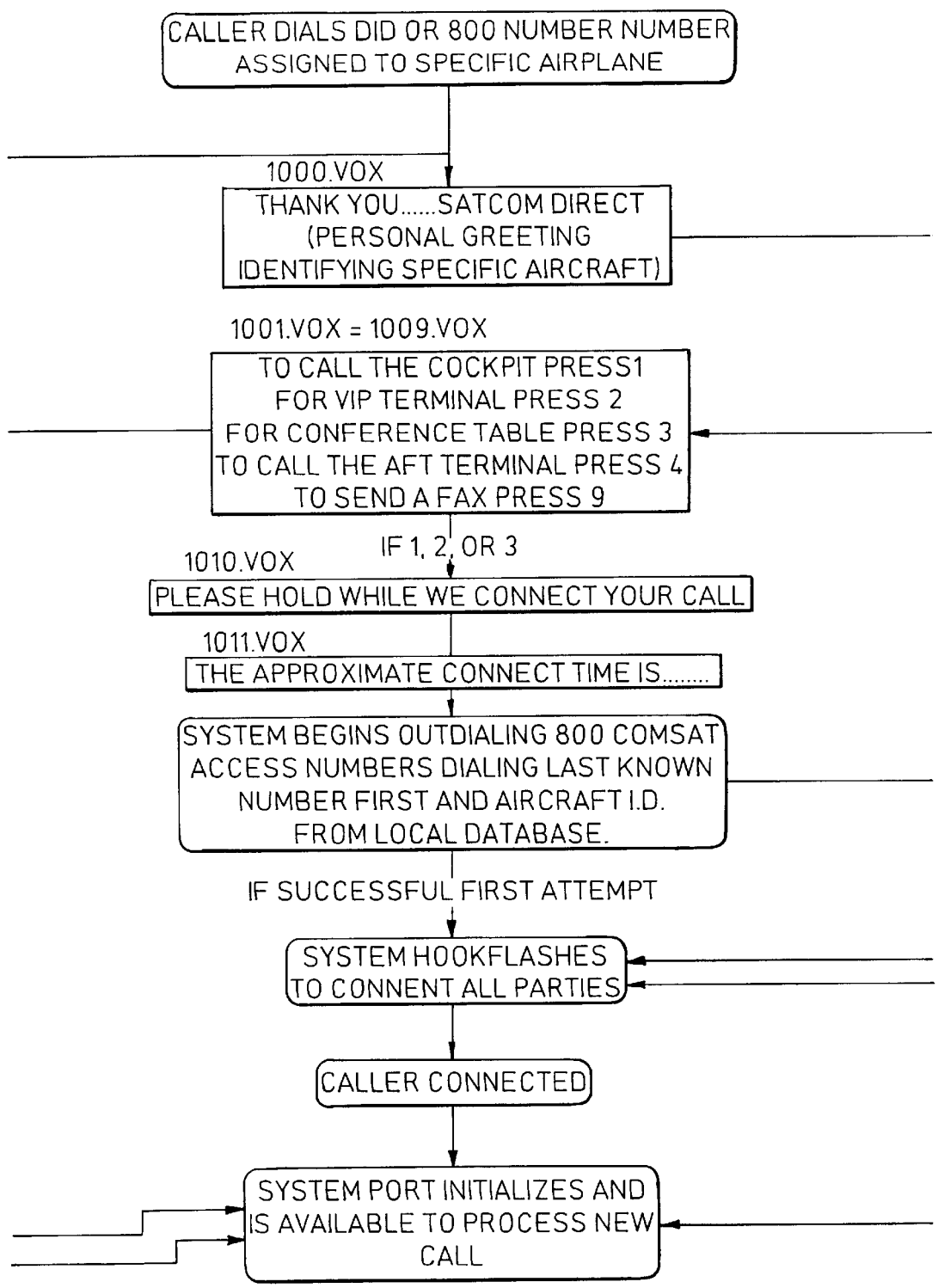
Figure 3C:
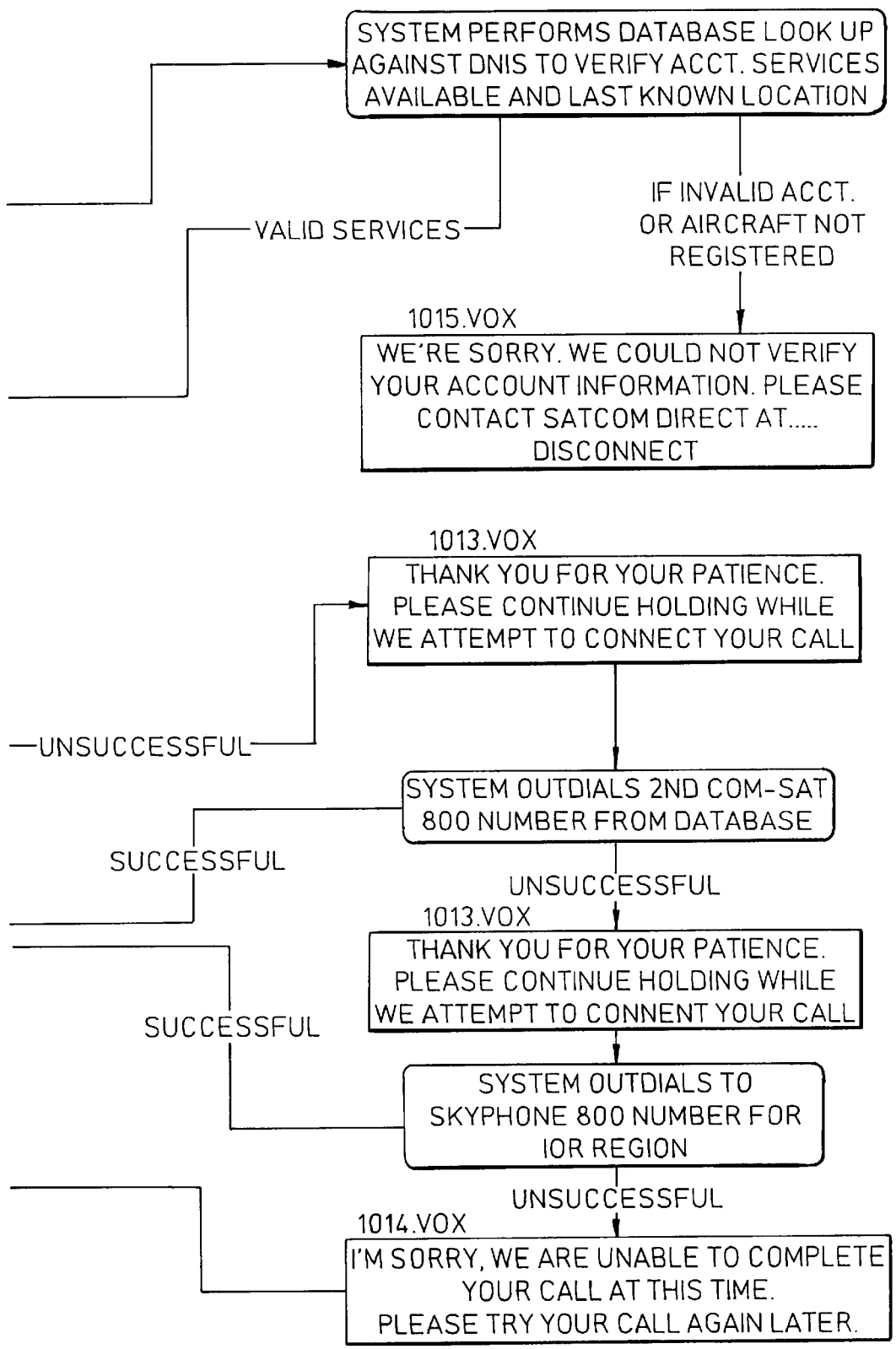

In the event the connection is not successful at the first attempt, the program logic broadcasts a message to the caller with instructions to continue holding while trying to dial a second Comsat number from the satellite data base. If this is found to be unsuccessful, the system repeats the instruction for the caller to continue holding and dials a number for the IOR region. This number is a Skyphone number. If this third attempt fails to connect the caller, the program logic posts a message to the caller to try the call again and reverts back to an idle mode by initializing the system port to process a new call. If any of the calls during the first, second or third attempt are successful, the system hook flashes to connect all parties and consequently the program logic described hereinabove. As indicated in FIG. 1, the system attempts to contact the aircraft in the AOR-W, POR and IOR regions, as dictated by the program. Because of satellite coverage overlaps, the AOR-E satellite is redundant and a space craft in the AOR-E region will be contacted by a call to either the AOR-W or IOR regions.

Another aspect of the program logic includes management and process of fax communications between GES and a specific aircraft. After, a caller dials the specific number assigned to a specific aircraft, the program logic looks for a fax tone. If a fax tone is detected, the program out-dials out up to three satellite access numbers and fax terminal ID numbers for the specified aircraft via data base lookup. A fax is sent by the user following the normal procedures for sending a terrrestially transmitted fax. No special procedures are required for initiating a fax transmission to the space craft. This makes fax transmission with the space craft very user friendly. In the event a successful connection is made, the fax is sent and the transaction logged in a billing file or equivalent. If the line is busy or not responsive, the program logic sends a busy or no answer signal to the sender. At the end of both successful and unsuccessful fax transmission cases, the program logic reverts back to an idle mode where the system port is initialized and made available to process the next fax or phone call.

The program logic also provides the option for a caller to execute a direct call and using an options menu to send a fax. For example, the caller is provided with a set of options to connect with the cockpit, VIP terminal, conference table, or aft terminal in the aircraft. Additionally, the caller is given the option to send a fax. In either case, the program logic proceeds in the manner discussed hereinabove to execute a call or a fax.

Figure 4B:
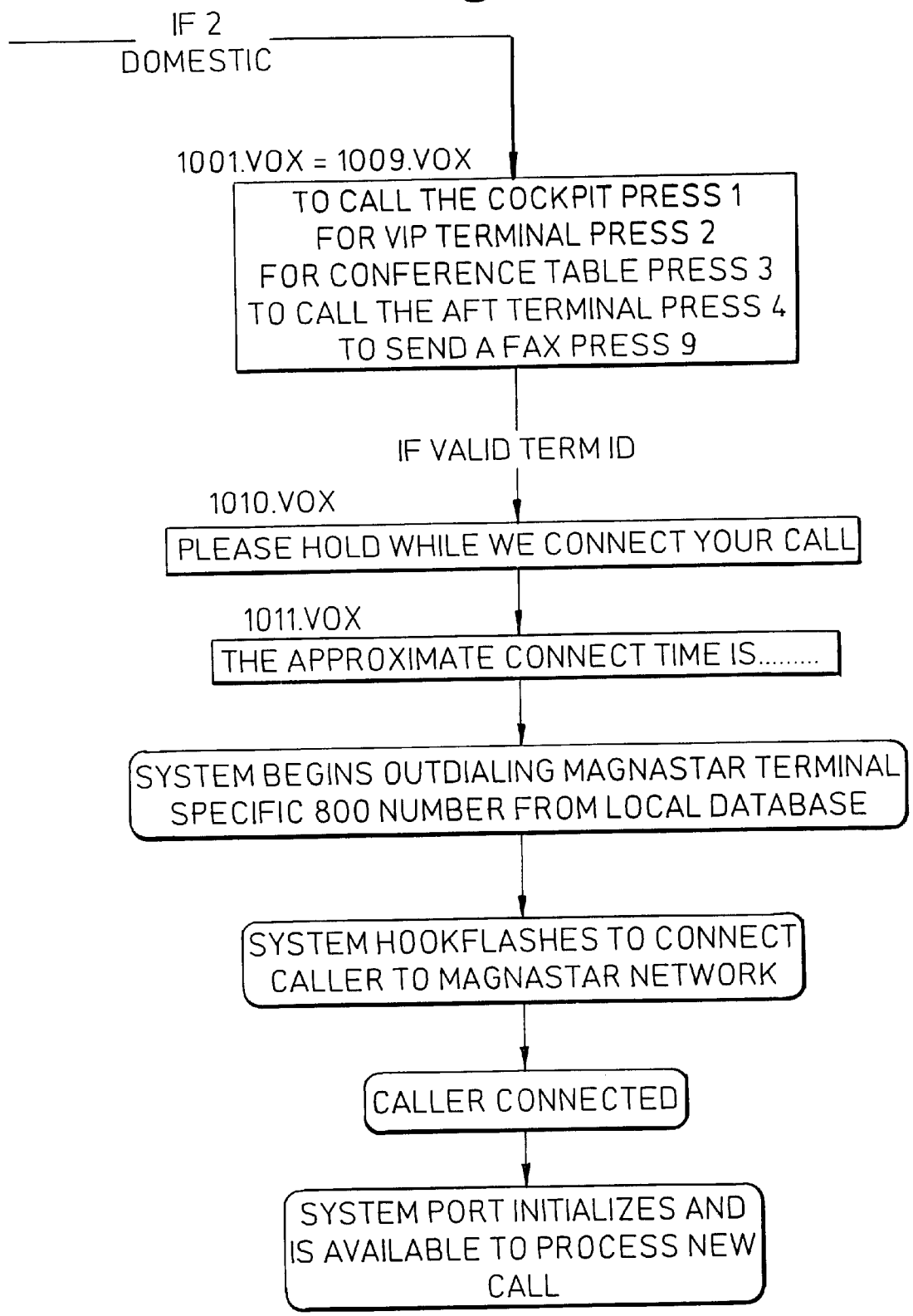

FIGS. 4A and 4B provide a program logic flow chart which is substantially similar to FIG. 3 with the exception of the additional logic steps to enable the caller to place a domestic call. In this regard, the program logic initiates outdialing terrestial calling system terminal specific numbers from a local database. Subsequently, the system hook flashes to connect the caller to the terrestial calling system network and the caller is successfully connected. Thereafter, the program logic proceeds to an idle mode and initializes the system port to make it available and ready to process the next call.

Most commercial airlines have passenger telephone systems installed in each aircraft and every aircraft has an ARINC specific 2-way data connection. ARINC is an organization that controls the aeronautical data network. Airlines lease time from ARINC to monitor each aircraft departure, arrival, engine performance, gate arrival and passenger names.

The basic technical infrastructure for Satcom Direct is in place. The aircraft telephone systems are already installed. There is a data link (ACARS) that connects into ARINC which provides passenger name and seating information. Technically, everything is in place except a call routing system. The call routing system is the present invention.

The present invention includes a telephone routing switch. This switch may be connected into the ARINC network where it may be automatically updated with airline flight information and passenger seating assignments. This access provides the switch of the present invention with updated information to track passengers seven (7) days a week twenty-four (24) hours a day.

The system of the present invention provides one toll free number for all ground to commercial aircraft callers. Multiple numbers are not required and this one number works for all airline passengers anywhere in the world. When a caller wants to call an airline passenger, the caller dials Satcom Direct's toll free number, listens to voice prompts that instruct the caller to enter the person's name they want to call and the switch locates the passenger and automatically places a call to the passenger's seat on the appropriate flight.

Accordingly, the invention encompasses several improvements over the prior art. However, this disclosure is intended to provide a basic outline of the structure and operations of the invention and should not be construed as a comprehensive disclosure of the invention. The applicant reserves the right to claim, elaborate and discuss in various and appropriate details any and each of the elements shown in the disclosure submitted herewith when a formal application is filed.

What is claimed is:

1. An automated communication system for communicatively connecting a caller by means of a telephone to a space craft, comprising:

a port for accepting a telephonic call related to a specific space craft from the caller and having a machine readable call management program, the call management program being responsive to a single telephone number consisting essentially of ten digits, three digits assigned to an area code, seven digits assigned to a spacecraft specific identifier and automatically effecting a telephonic communication to at least one selected ground earth station responsive thereto;

the ground earth station effecting communication with at least one known satellite in an earth orbit responsive to the received communication from the port; and the satellite retransmitting the ground earth station communications to the specific space craft for reception by a dedicated receiver in the space craft, thereby establishing a telephonic communications link from the caller to the specific space craft.

2. The communication system of claim 1 wherein the port management program sequentially initiates communications with up to three satellites in a global search for a response from the specific space craft.

3. The communication system of claim 2 wherein the port management program sequentially initiates communications with up to three satellites in a global search for a response from the specific space craft, the three satellites serving global regions designated AOR-W, POR, and IOR.

4. The communication system of claim 2 wherein the port management program sequentially initiates communications with up to three satellites in a global search for a response from the specific space craft, commencing with a satellite serving a last global region in which the specific space craft was known to be located.

5. The communication system of claim 2 including an operators data base, the data base including a table having a preference for a first of at least two ground stations, each of the at least two ground stations being associated with a selected satellite for communication with the satellite.

6. The communication system of claim 5 wherein the table of the operators data base includes a table having at least two ground stations being associated with each of at least three satellites.

7. The communication system of claim 1 wherein the port management program provides voice prompts to the caller telephone requesting transmission of a digit related to a specific phone site in the specific space craft for connection to the caller.

8. A computer-implemented program for managing direct communications between a port, a ground station and a space craft via a satellite system comprising:

a set of operators data bases implemented in the ground station, the space craft and the satellite system;

means for initiating a management program in the port wherein the call management program is initiated by a single telephone number consisting essentially of ten digits, three digits assigned to an area code, seven digits assigned to a spacecraft specific identifier; and means for performing a communication process based on the operators data base under the control of the management program, the communication process being with a specific spacecraft responsive to the spacecraft specific identifier related to the specific spacecraft.

9. The computer-implemented program of claim 8 wherein the port management program sequentially initiates communications with up to three satellites in a global search for a response from the specific space craft.

10. The computer-implemented program of claim 9 wherein the port management program sequentially initiates communications with up to three satellites in a global search for a response from the specific space craft, the three satellites serving global regions designated AOR-W, POR, and IOR.

11. The computer-implemented program of claim 10 wherein the port management program sequentially initiates communications with up to three satellites in a global search for a response from the specific space craft, commencing with a satellite serving a last global region in which the specific space craft was known to be located.

12. The computer-implemented program of claim 8 wherein the port management program provides voice prompts to the caller telephone requesting transmission of a digit related to a specific phone site in the specific space craft for connection to the caller.

13. The computer-implemented program of claim 8, the operators data base including a table having a preference for a first of at least two ground stations, each of the at least two ground stations being associated with a selected satellite for communication with the satellite.

14. The computer-implemented program of claim 13 wherein the table of the operators data base includes a table having at least two ground stations being associated with each of at least three satellites.

15. A method of processing global communications between a ground station, a plurality of global satellite systems and a specific space craft using a software system, the method including the steps of:

assigning a space craft specific identifier to the space craft;

telephonic accessing of an operators data base for the space craft and the satellite system by entering a single telephone number consisting essentially of ten digits, three digits assigned to an area code, seven digits assigned to a spacecraft specific identifier;

performing a data base lookup for validation;

providing a set of menus to facilitate direct communication;

outdialing access numbers for the satellite systems and the space craft ID from said operators data base;

generating a successful connection signal; and initializing a system port to process a new call.

16. The method of processing global communications of claim 15 wherein the operators data base sequentially initiates communications with up to three satellites in a global search for a response from the specific space craft.

17. The method of processing global communications of claim 16 wherein the operators data base sequentially initiates communications with up to three satellites in a global search for a response from the specific space craft, the three satellites serving global regions designated AOR-W, POR, and IOR.

18. The method of processing global communications of claim 17 wherein the operators data base sequentially initiates communications with up to three satellites in a global search for a response from the specific space craft, commencing with a satellite serving a last global region in which the specific space craft was known to be located.

19. The method of processing global communications of claim 15 wherein the operators data base provides voice prompts to the caller telephone requesting transmission of a digit related to a specific phone site in the specific space craft for connection to the caller.

20. The method of processing global communications of claim 15, the operators data base including a table having a preference for a first of at least two ground stations, each of the at least two ground stations being associated with a selected satellite for communication with the satellite.

21. The method of processing global communications of claim 20 wherein the table of the operators data base includes a table having at least two ground stations being associated with each of at least three satellites.

22. An automated communication system for communicatively connecting a caller by means of a telephone to a specific space craft, the call being routed through a port for accepting a telephonic call and having a machine readable call management program, the call management program automatically effecting a telephonic communication to at least one selected ground earth station responsive thereto, the ground earth station effecting communication with at least one known satellite in an earth orbit responsive to the received communication from the port and, the satellite retransmitting the ground earth station communications to the space craft for reception by a dedicated receiver in the space craft, comprising:

caller access to the system being effected by a number consisting essentially of a single ten digit telephone number three digits assigned to an area code, seven digits assigned to the specific space craft being called.

23. The communication system of claim 22 wherein the port management program sequentially initiates communications with up to three satellites in a global search for a response from the specific space craft.

24. The communication system of claim 23 wherein the port management program sequentially initiates communications with up to three satellites in a global search for a response from the specific space craft, the three satellites serving global regions designated AOR-W, POR, and IOR.

25. The communication system of claim 23 wherein the port management program sequentially initiates communications with up to three satellites in a global search for a response from the specific space craft, commencing with a satellite serving a last global region in which the specific space craft was known to be located.

26. The communication system of claim 23 including an operators data base, the data base including a table having a preference for a first of at least two ground stations, each of the at least two ground stations being associated with a selected satellite for communication with the satellite.

27. The communication system of claim 26 wherein the table of the operators data base includes a table having at least two ground stations being associated with each of at least three satellites.

28. The communication system of claim 22 wherein the port management program provides voice prompts to the caller telephone requesting transmission of a digit related to a specific phone site in the specific space craft for connection to the caller.

29. The communication system of claim 22 wherein the single ten digit telephone number is viewably presented on at least one wallet sized card, the card being presentable to a user.

30. The communication system of claim 22 wherein the single ten digit telephone number initiates communication with a space craft through terrestial telephonic communications to the port.

31. The communication system of claim 22 wherein caller access enables communication with the space craft by means of facsimile transmission.

\* \* \* \* \*